June 26, 1956 P. R. R. AIGRAIN 2,752,489
POTENTIAL COMPARING DEVICE
Filed March 2, 1951
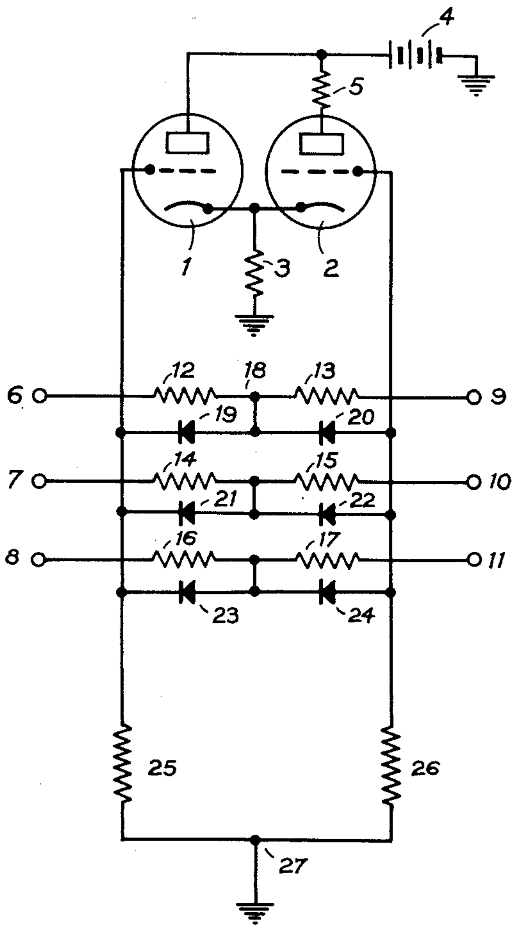
INVENTOR
PIERRE R. R. AIGRAIN
BY Robert Harding
ATTORNEY United States Patent Office 2,752,489

Patented June 26, 1956

2,752,489

POTENTIAL COMPARING DEVICE

Pierre R. R. Aigrain, Paris, France, assignor to International Standard Electric Corporation, New York, N. Y., a corporation of Delaware Application March 2, 1951, Serial No. 213,513

Claims priority, application France March 3, 1950

6 Claims. (Cl. 250—27)

The present invention relates to circuits for comparing electrical magnitudes such as signalling codes and more particularly the invention relates to circuits for comparing, as combinations of electrical magnitudes, for instance potentials, numerical values expressed for instance in the binary system of numeration.

In the following description reference will be made to binary numeration system and there will be designated by "code" a number expressed in this numeration system and by "code element" each one of the digits constituting the said code. Each one of the code elements may be constituted by two values which will be represented by 0 and 1, the number 26 being represented then by 11010. It is also agreed to designate by "complementary code" of a given code, the code comprising the same number of code elements and which added to the said code will give the maximum number which will be expressed with the same number of code elements. In the case under consideration the complementary code of 11010 (26) is 00101 (5) the sum of the two codes being 11111 (31).

In numerous systems utilising numerical values expressed in the binary system of numeration, as for example, in certain electronic switching systems or in certain electronic computing machines, each code element which may take two values 0 or 1 is characterized by two potentials, for instance −V for 0 and +V for 1. One is often led to compare two codes represented as a potential combination; the device used for this comparison is adapted to send a signal when the codes being compared are in a given relationship for example when they are complementary.

One of the objects of the present invention is to provide an arrangement for comparing numerical magnitudes expressed in the binary system of numeration under the form of potential combinations and utilizing electronic means and in which all the code elements characterizing one of the numerical magnitudes are simultaneously compared respectively to the corresponding elements of the other numerical magnitudes.

Another object of the present invention is to provide a comparing device for numerical data expressed as potential combinations in the binary system of numeration and which sends a signal each time that the codes representing the numerical data are complementary.

According to another feature of the invention a circuit for comparing numerical data expressed as combinations of electrical characteristics in the binary system of numeration comprises in combination a plurality of test means, each one of the said test means individual to two corresponding code elements being adapted to raise one electrical characteristic of one point of the circuit to a predetermined value when the electrical characteristics of two complementary code elements applied thereto associated with means sensitive to variations of the electrical magnitude of the said test means and adapted to modify the electrical characteristic of one of the points of their circuit when the electrical characteristic of all of said test means is at the said predetermined value.

According to another feature of the invention in such systems each of the said test means comprises in combination two terminals to which are respectively applied potentials characteristic of the value of the two corresponding code elements, two impedances connected in series between the said two terminals, two rectifying cells connected in series and in the same direction, the common point of the said two rectifying cells being connected to a common point of the said two impedances, the other terminals of the said rectifying cells being connected respectively by means of two resistances to a common point, means for carrying the said common point to a predetermined potential comprised between the characteristic potentials of the said two values of the said code elements; the characteristic potentials of the values of the said code elements, the magnitude of the impedances and the predetermined potential to which is carried the common point to the said two resistances being chosen in order that the potential of the common points to the resistances and the rectifying cells be a predetermined potential to which is carried the common point to the said two resistances when the potentials applied respectively to the two terminals of the two impedances correspond to two complementary code elements.

According to another feature of the invention in such devices the resistances a common point of which is carried to a predetermined potential are common to a plurality of test means, the common points of the said two resistances and to the said rectifying cells of all the test means being carried to a potential corresponding to that of the common point to the said two resistances when the two codes applied respectively to the two groups of terminals to which are connected the said impedances are complementary.

According to another feature of the invention a potential comparing circuit comprises in combination a plurality of test means the two output terminals of which are carried to a predetermined potential when the codes which are applied thereto under the form of a potential combination are complementary, a differential amplifier the two input terminals of which are respectively connected to the two output terminals of the said test means, the said differential amplifier being adjusted in order to carry one point of its circuit to a predetermined potential when the output terminals of the said test means are at the same potential.

Other objects, features and advantages of the present invention will appear from reading the present description of an embodiment illustrated in the single figure of the annexed drawing.

There will be assumed in the following description that each code is applied as a combination of positive and negative potentials, for example — or +48 volts.

There is shown in 1 and 2 two triodes the cathodes of which are connected to ground by a common resistance 3; the positive terminal of the high tension battery 4 is connected, on the one hand directly to the plate of the triode 1 and on the other hand to the plate of triode 2 by means of a resistance 5. The code used as a reference which will be supposed to be a three element code is applied to terminals 6, 7 and 8, whereas the code to be compared is applied to terminals 9, 10 and 11. The terminals 6 and 9 are connected by two equal resistances 12 and 13. Likewise the terminals 7 and 10, 8 and 11, are respectively connected by equal resistances 14, 15, 16 and 17. The common point 18 to resistances 12 and 13 is connected to two rectifying cells 19 and 20 the other terminals of which are respectively connected to the grids of triodes 1 and 2. The rectifying cells 21, 22, 23 and 24 are connected in like manner. Each terminal may be carried to + or −48 volts according to the applied code. If the terminals 6 and 9 are carried to opposite potentials, for example +48 volts for terminal 6 and −48 volts for terminal 9, point 18 will be at ground potential and no current will be set up between point 18 and point 27 through rectifying cells 19 or 20. If the terminals 6 and 9 are carried to a potential of +48 volts, point 18 is at potential +48 volts and a current will flow between point 18 and point 27 through rectifying cell 19 and resistance 25. The potential of the grid of triode 1 is then carried to a potential near +48 volts, the potential of the grid of triode 2 being then near 0 volt. If the terminals 6 and 9 are simultaneously carried to potential −48 volts, point 18 is at potential −48 volts and a current takes place between point 18 and point 27 through rectifying cell 20 and resistance 26 carrying the potential of the grid of triode 2 to a potential close to −48 volts, the grid of triode 1 being then at a potential close to 0 volt. When the grid of triode 1 is positive (+48 volts) this triode is conducting and the cathodes of triodes 1 and 2 are brought to a positive potential with respect to ground. The potential of the grid of triode 2 is then close to 0 and this triode is blocked. Its anode is at the potential of the positive terminal of the high tension battery. When the grid of triode 2 is at the potential −48 volts, triode 2 is blocked and its anode is at the potential of the positive terminal of the high tension battery. In order that triode 2 be conducting, it is necessary that the potential of the grids of the triodes 1 and 2 be close to 0 volt and this can only be realized when the potentials applied to the corresponding terminals, 6, 9, 7 and 10, 8 and 11 are opposed, that is to say when the codes to be compared are complementary. If the combinations of positive and negative potentials characterising the reference code and applied to terminals 6, 7 and 8 are transmitted in a continuous fashion and if there is successively applied the various possible codes to terminals 9, 10 and 11, there will be obtained a negative impulse from the anode of triode 2 when the code applied to terminals 9, 10 and 11 is the code complementary to the code applied to terminals 6, 7 and 8.

Although the present invention has been described in connection with a particular embodiment, it is clear that it is not limited to such embodiment and on the contrary the invention is capable of numerous modifications and changes without departing from its domain.

I claim:

1. A potential comparing device comprising a differential amplifier having two input circuits with a common portion and adapted to have two conditions of operation, a source of potential, said common portion being connected to one terminal of said source, a resistance in each of said input circuits between said amplifier and said common portion, said amplifier being adjusted so that said input circuits normally maintain one condition of operation of said amplifier, a pair of unidirectional current-carrying devices connected in series between said input circuits at the ends of said resistances farthest from said common portion, said devices having the same polarity, a pair of resistances each having a first end connected to the juncture of said devices, means for applying a reference potential to the other end of one of said last-mentioned resistances, whereby the potential on one of said input circuits is changed in a direction to cause said amplifier to assume the other condition of operation, and means for applying a potential to be compared to the other end of the other of said last-mentioned resistances, whereby when said potential to be compared is of sufficient value and polarity to counter-balance said reference potential, said amplifier will be restored to its original condition of operation.

2. A potential comparing device, as defined in claim 1, in which there are a plurality of pairs of unidirectional current-carrying devices, each pair being connected in series between said input circuits with the same polarity, and in which there are a plurality of pairs of resistances, each resistance of a pair having a first end connected to the juncture of a pair of devices, and in which there are a plurality of means for applying reference potentials, one to the other end of one of the resistances in each pair, and in which there are a plurality of means for applying potentials to be compared, one to the other end of each of the other resistances of each pair.

3. A potential comparing device, as defined in claim 1, in which the resistances connected to the juncture of said unidirectional current-carrying devices are equal.

4. A potential comparing device, as defined in claim 1, in which the amplifier comprises a pair of tubes adjusted so that one is normally conducting and the other is non-conducting and any change in potential at the juncture of the unidirectional current-carrying devices will reverse the conductivity of said tubes.

5. A potential comparing device, as defined in claim 4, in which said tubes comprise a common cathode circuit, a resistance connecting said circuit to ground, a source of anode potential, a direct connection between the anode of one of said tubes and said source of anode potential, and a resistance connected between the anode of the other of said tubes and said source of potential.

6. A potential comparing device, as defined in claim 5, in which there are a plurality of pairs of unidirectional current-carrying devices connected between said input circuits with the same polarity, and in which there are a plurality of pairs of resistances, one pair being connected to the juncture of each pair of devices, and in which there are a plurality of means for applying reference potentials, one to one of the resistances of each pair, and in which there are a plurality of means for applying potentials to be compared, one to each of the other resistances of each pair.

References Cited in the file of this patent

UNITED STATES PATENTS

| | | |
|---|---|---|
| 2,513,525 | Shenk et al. | July 4, 1950 |
| 2,556,200 | Lesti | June 12, 1951 |
| 2,616,045 | Brubaker | Oct. 28, 1952 |
| 2,632,845 | Goldberg | Mar. 24, 1953 |